United States Patent
Aono

(10) Patent No.: US 9,462,155 B2
(45) Date of Patent: Oct. 4, 2016

(54) METHOD, DEVICE, AND PROGRAM PRODUCT FOR DOT AREA EXTRACTION BASED ON PERIODICITY OF DIFFERENT NUMBERS ON PIXELS IN CROSSING DIRECTIONS

(71) Applicant: FUJI XEROX CO., LTD., Tokyo (JP)

(72) Inventor: Hiroyuki Aono, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/824,645

(22) Filed: Aug. 12, 2015

(65) Prior Publication Data

US 2016/0219188 A1 Jul. 28, 2016

(30) Foreign Application Priority Data

Jan. 23, 2015 (JP) ................. 2015-011452

(51) Int. Cl.
| | | |
|---|---|---|
| *H04N 1/405* | (2006.01) | |
| *H04N 1/407* | (2006.01) | |
| *G06K 15/02* | (2006.01) | |
| *H04N 1/40* | (2006.01) | |
| *H04N 1/29* | (2006.01) | |
| *G06K 15/14* | (2006.01) | |

(52) U.S. Cl.
CPC ...... *H04N 1/40075* (2013.01); *G06K 15/1881* (2013.01); *H04N 1/4055* (2013.01); *H04N 1/4072* (2013.01); *G06K 15/14* (2013.01); *H04N 1/29* (2013.01)

(58) Field of Classification Search
None
See application file for complete search history.

(56) References Cited

U.S. PATENT DOCUMENTS 8,797,555 B2 * 8/2014 Doi ...................... H04N 1/4092
358/1.1

FOREIGN PATENT DOCUMENTS

| JP | S63-142765 A | 6/1988 |
|---|---|---|
| JP | H08-149298 A | 6/1996 |
| JP | 2010-187362 A | 8/2010 |

* cited by examiner

*Primary Examiner* — Scott A Rogers
(74) *Attorney, Agent, or Firm* — Oliff PLC

(57) ABSTRACT

Provided is a dot area extraction method including extracting a first dot area in binary data based on periodicity of pixels for every first range by dividing the binary data in a first direction or a second direction in the first range which includes a first number of pixels in the first direction and a second number of pixels in the second direction, and extracting a second dot area in the binary data based on the periodicity of the pixels for every second range by dividing the binary data in the first direction or the second direction in the second range which includes a third number of pixels in the first direction and a fourth number of pixels in the second direction.

19 Claims, 10 Drawing Sheets

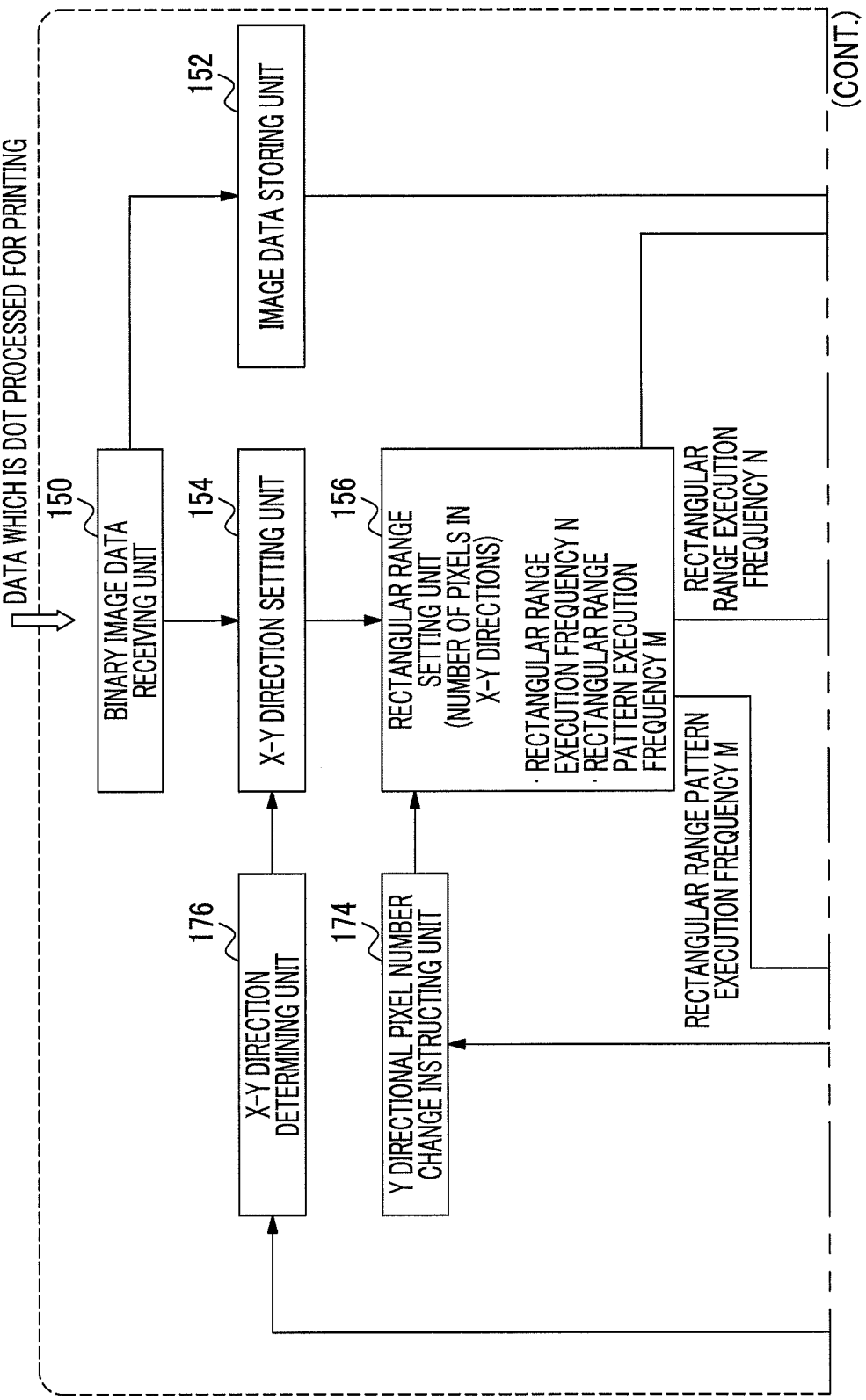

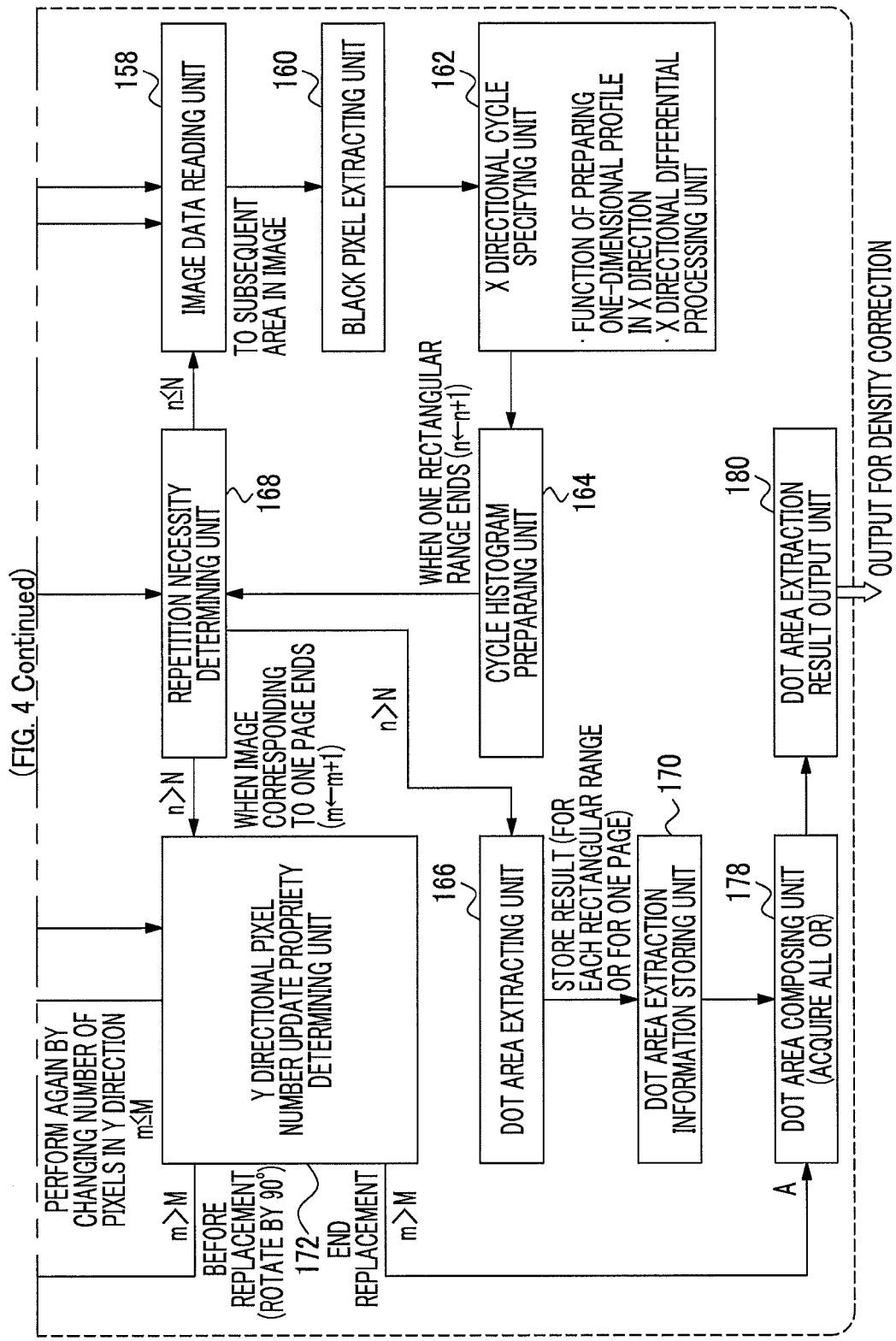

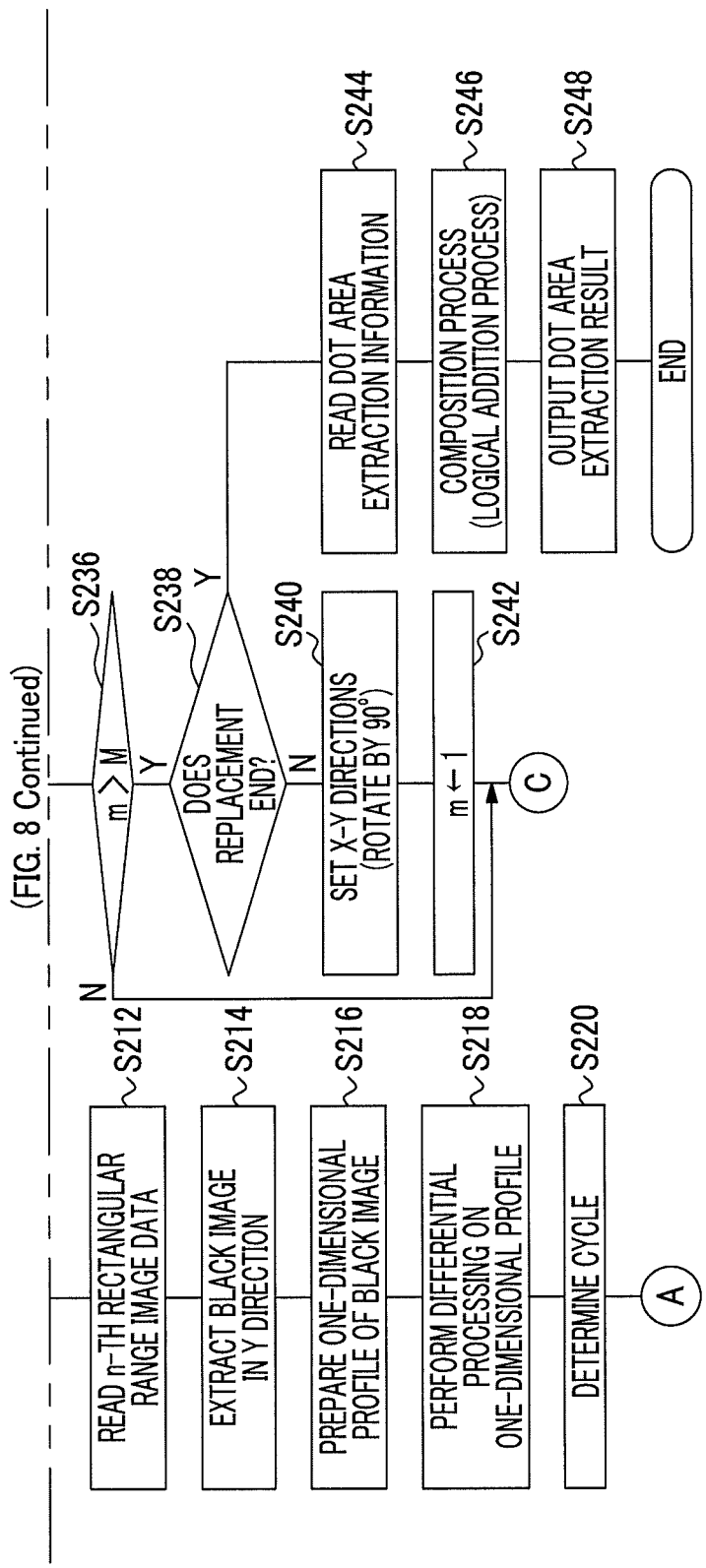

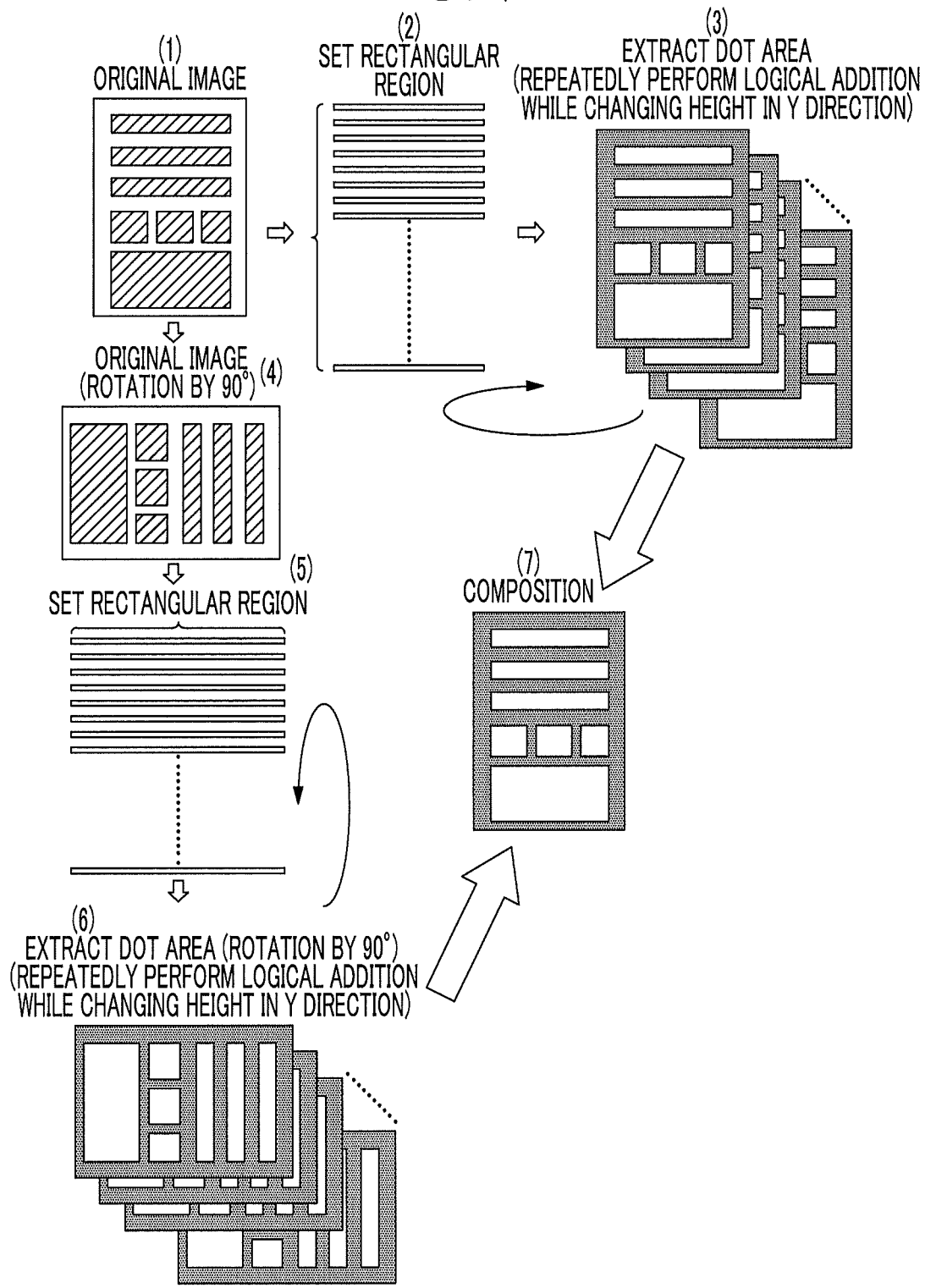

METHOD, DEVICE, AND PROGRAM PRODUCT FOR DOT AREA EXTRACTION BASED ON PERIODICITY OF DIFFERENT NUMBERS ON PIXELS IN CROSSING DIRECTIONS

CROSS-REFERENCE TO RELATED APPLICATIONS

This application is based on and claims priority under 35 USC 119 from Japanese Patent Application No. 2015-011452 filed Jan. 23, 2015.

BACKGROUND (i) Technical Field

The present invention relates to a dot area extraction method, a dot area extraction device, and a non-transitory computer readable medium storing a dot area extraction program.

(ii) Related Art

When an image is formed using a developer, such as a toner, under an electrophotograpic manner by directly using binary image information which is dot (halftone)-processed for printing, the fidelity of density of dot areas is damaged.

At this time, there is a case in which a technology for extracting the dot areas from an entire image area is used. For example, when the dot areas are extracted from the binary image information and density correction is performed, the fidelity of the density, acquired when the image is formed in the electrophotograpic manner, is compensated with regard to the density of a printing image.

Meanwhile, there is a case in which the arrangement pattern of dots in dot processing is called a screen and the dot processing is called screening.

SUMMARY

According to an aspect of the invention, there is provided a dot area extraction method including:

extracting a first dot area in binary data based on periodicity of pixels for every first range by dividing the binary data in a first direction or a second direction in the first range which includes a first number of pixels in the first direction and a second number of pixels in the second direction; and extracting a second dot area in the binary data based on the periodicity of the pixels for every second range by dividing the binary data in the first direction or the second direction in the second range which includes a third number of pixels in the first direction and a fourth number of pixels in the second direction, wherein the first direction crosses the second direction, wherein at least the first number of pixels is not equal to the third number of pixels, or the second number of pixels is not equal to the fourth number of pixels, and wherein a dot area of the binary data is extracted by combining respective results of extraction of the first dot area and the second dot area.

BRIEF DESCRIPTION OF THE DRAWINGS

Exemplary embodiments of the present invention will be described in detail based on the following figures, wherein:

FIG. 4 is a functional block diagram for executing dot area extraction control according to the exemplary embodiment;

FIG. 5A illustrates an upright image and FIG. 5B is a 90°-rotated image;

FIG. 9 is a diagram illustrating a visually expressed flow of a dot area extraction course according to the flow of the flowchart of FIG. 8.

DETAILED DESCRIPTION

Figure 1:
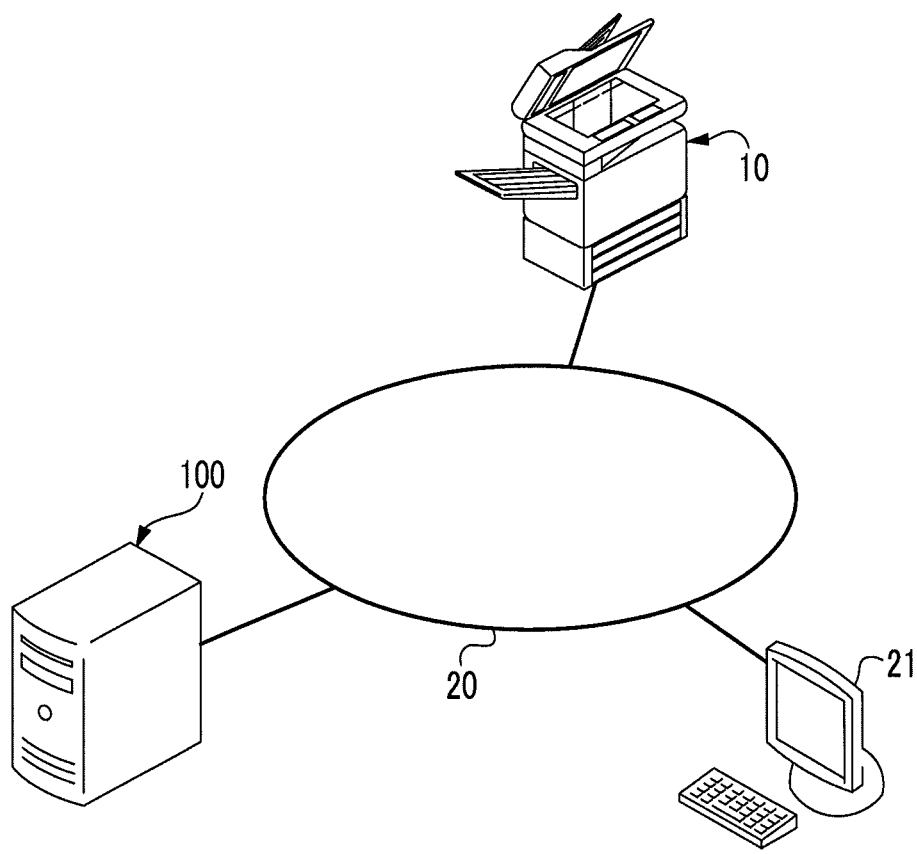
FIG. 1 is a diagram illustrating the schematic configuration of an image processing system according to an exemplary embodiment.

FIG. 1 illustrates an image processing system which includes a dot area extraction function according to an exemplary embodiment.

In the image processing system, an image processing device 10, a server 100, and a personal computer (PC) 21 are respectively connected to a communication line network 20 such that it is possible to communicate with each other.

Meanwhile, the present invention is not limited to only the single image processing device 10 and the single PC 21, and plural image processing devices 10 and plural PCs 21 may be connected.

Here, the image processing device 10, which is connected to the communication line network 20, includes at least a specific image processing device 10 which includes a function (for example, there is a case referred to as an "1 bit-Tiff direct output function") capable of forming an image by directly using printing image data (hereinafter, referred to as "binary image data") which is dot-processed (screened) binary image information. The specific image processing device 10 is capable of performing a process with a resolution of, for example, 2,400 dpi which is higher than the general resolution of (300 to 1,200 dpi) of the image processing device 10.

Meanwhile, hereinafter, in a case of being called the "image processing device 10", the specific image processing device 10 is included.

The communication line network 20 is, for example, a Local Area Network (LAN), and plural LANs (communication line network 20) may be connected to each other through a Wide Area Network (WAN). In addition, the entire communication line network, which includes the communication line network 20, is not necessarily wired connection. That is, the communication line network may be a wireless communication line network which transmits and receives information wirelessly.

There is a case in which the image processing device 10 receives an image forming (printing) instruction operation by transmitting, for example, data remotely from the PC 21 to the image processing device 10, or there is a case in which the image processing device 10 receives, for example, copying, scanning (image reading), or facsimile transmitting and receiving process instructions according to various operations supplied by a user standing in front of the image processing device 10.

The server 100 mainly has functions of temporarily preserving the image data which is received through the communication line network 20, and transmitting the image data to the image processing device 10.

In the exemplary embodiment, there is a case in which the server 100 temporarily stores the dot-processed binary image data. That is, the server 100 has a function as a dot area extraction device.

In the server 100, a dot area is extracted based on the temporarily stored binary image data, density correction is performed on the extracted dot area, and then the resulting dot area is transmitted to the specific image processing device 10.

Figure 2:
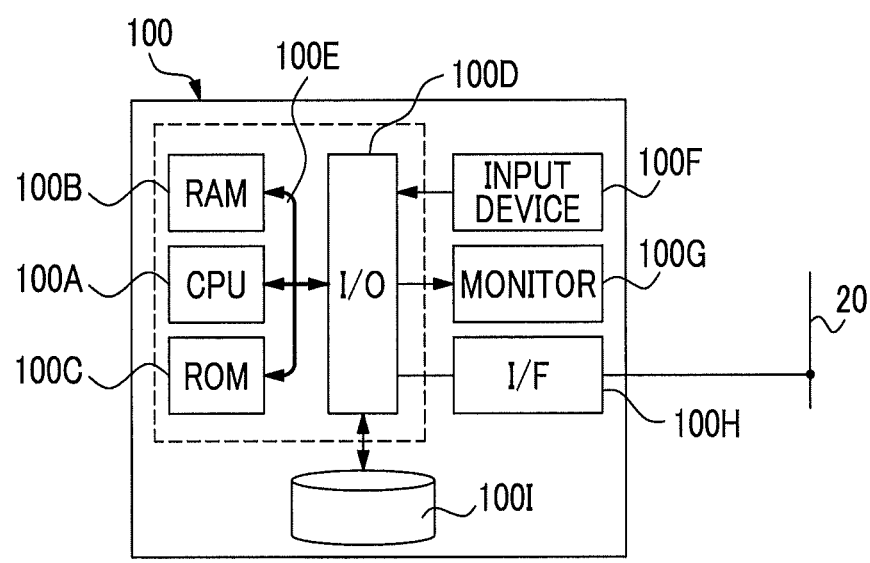
FIG. 2 is a control block diagram illustrating the hardware configuration of a management server according to the exemplary embodiment.

As illustrated in FIG. 2, the server 100 includes a CPU 100A, a RAM 100B, a ROM 100C, an I/O 100D, and a bus 100E, such as a data bus or a control bus, which connects the CPU 100A, the RAM 100B, the ROM 100C, and the I/O 100D to each other.

An input device 100F, such as a keyboard or a mouse, and a monitor 100G are connected to the I/O 100D. In addition, the I/O 100D is connected to the communication line network 20 through an I/F 100H. Further, as a large scale recording medium, a hard disk (HDD) 1001 is connected to the I/O 100D.

Schematic Configuration of Image Processing Device

Figure 3:
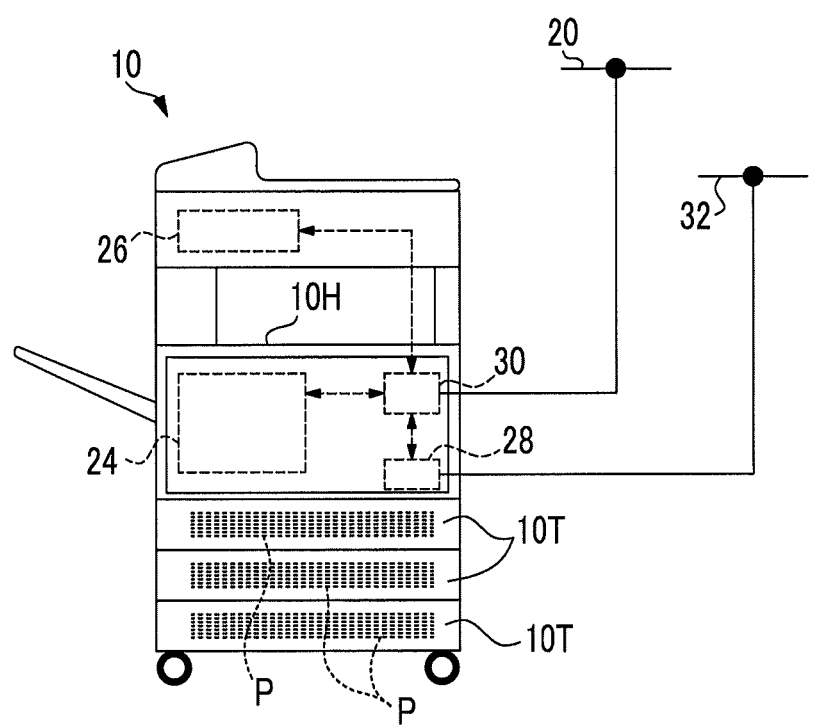
FIG. 3 is a diagram illustrating the schematic configuration of an image processing device according to the exemplary embodiment.

FIG. 3 illustrates the image processing device 10 according to the exemplary embodiment. Meanwhile, there is a case in which the appearance or a part of the function (resolution or the like) of the image processing device 10 is different according to manufacture information including a format, a type, and a grade. Hereinafter, the general structure and the function of the image processing device 10 will be described.

There is a case in which the image processing device 10 is provided with an optional function or a new function or a case in which a new product is substituted for a product of the image processing device 10. Further, a case is included in which the image processing device 10 is mounted with some parts of functions (an image forming function, an image reading function, and a facsimile communication function) of a general structure which will be described later.

As the general structure, the image processing device 10 includes an image forming unit 24 which forms an image on a recording paper P, an image reading unit 26 which reads a manuscript image, and a facsimile communication control circuit 28. In addition, the image processing device 10 includes a main control unit 30 (hereinafter, there is a case referred to as a "main controller 30") which generally controls the entire device. The image processing device 10 controls the image forming unit 24, the image reading unit 26, and the facsimile communication control circuit 28 so as to temporarily store the image data of the manuscript image which is read by the image reading unit 26 or to transmit the read image data to the image forming unit 24 or the facsimile communication control circuit 28.

The communication line network 20, such as the Internet, is connected to the main controller 30, and a telephone network 32 is connected to the facsimile communication control circuit 28. The main controller 30 is connected to the PC 21 (refer to FIG. 1) through, for example, the communication line network 20, and has functions of receiving the image data and performing facsimile reception and facsimile transmission through the facsimile communication control circuit 28 using the telephone network 32.

The image reading unit 26 is provided with a manuscript table in which the location of the manuscript is determined, a scanning driving system which scans the image of the manuscript located on the manuscript table and which irradiates light, and a photoelectric conversion element, such as a CCD, which receives reflecting or passing light due to the scanning of the scanning driving system and converts light into electrical signals. Meanwhile, there is a case in which the opening/closing lid of the manuscript table is provided with an automatic manuscript transmission device (DADF) which automatically transmits the manuscript to the image reading position of the manuscript table.

The image forming unit 24 includes a photoreceptor. The periphery of the photoreceptor is provided with a charging device which uniformly charges the photoreceptor, a scanning/exposing unit which scans light beam based on the image data, an image developing unit which develops an electrostatic latent image formed by being scanned and exposed by the scanning/exposing unit, a transfer unit which transfers the developed image on the photoreceptor to the recording paper P, and a cleaning unit which cleans the surface of the photoreceptor after transfer is performed. The recording paper P is accommodated in a tray 10T of the image processing device 10, fetched from the tray 10T, and is sequentially fed to each part of the image forming unit 24.

In the image processing device 10, it is possible to execute plural jobs, which includes copying, printing, scanning, and FAX transmission and reception, by operating the image reading unit 26, the image forming unit 24, and the facsimile communication control circuit 28 independently or in a combined manner.

Dot Area Extraction Control Function

FIG. 4 is a functional block diagram for executing dot area extraction control in the server 100. Meanwhile, the functional block diagram is specialized in a dot area extraction control function but does not limit the hardware configuration of the server 100. In addition, the function (course) of executing the dot area extraction control illustrated in FIG. 4 is only an example and all of the functions illustrated in blocks are not necessary to be essential.

As described above, in the specific image processing device 10, it is possible to process at a resolution of resolution 2,400 dpi, and it is possible to form an image by directly applying the dot-processed (screened) binary image data.

Here, when an image is formed by the specific image processing device 10 based on the binary image data in an electrophotograpic manner, it is necessary to take reproducibility into consideration.

For example, the change in density affected by the dot size factors of a developer (toner) or the change in density affected by optical dot factors in printing may be an example of reproducibility. Generally, the density tends to be thick with regard to the image in printing regardless of the factors.

In contrast, for example, so-called black header images (characters and line images) do not have a problem related to reproducibility. Therefore, it is difficult to perform correction, in which the image density of the entire image is uniformly suppressed, in order to maintain reproducibility.

Here, in the exemplary embodiment, for example, a dot area (halftone area) is extracted from binary image data corresponding to one page, the extracted dot area is specialized, and correction is performed in order to maintain reproducibility (in order to suppress density).

In the dot area extraction function according to the exemplary embodiment, even though the number of screen lines and the screen angle are obscure in the dot-processed binary image data, it is possible to securely extract the dot area.

As illustrated in FIG. 4, a binary image data receiving unit 150 receives binary image data. The binary image data receiving unit 150 is connected to an image data storing unit 152 and an X-Y direction setting unit 154.

Meanwhile, hereinafter, when the direction of an image is defined, it is assumed that an X direction is a row direction which indicates a lateral (horizontal) direction and a Y direction is a column direction which indicates a longitudinal (vertical) direction in a front view regardless of the direction (top and bottom) of a two-dimensional image.

For example, in an upright state illustrated in FIG. 6A which will be described later, the X direction is the row direction and the Y direction is the column direction in paper. In contrast, in a 90°-rotated state illustrated in FIG. 6B, the Y direction is the row direction and the X direction is the column direction in paper.

The image data storing unit 152 temporarily stores the binary image data which is received by the binary image data receiving unit 150.

In the X-Y direction setting unit 154, at a time point that the binary image data receiving unit 150 receives the binary image data, the top and bottom direction of the image is set up based on the binary image data. When the top and bottom direction is settled, the X direction is a width direction and the Y direction is a height direction.

Figure 5A:
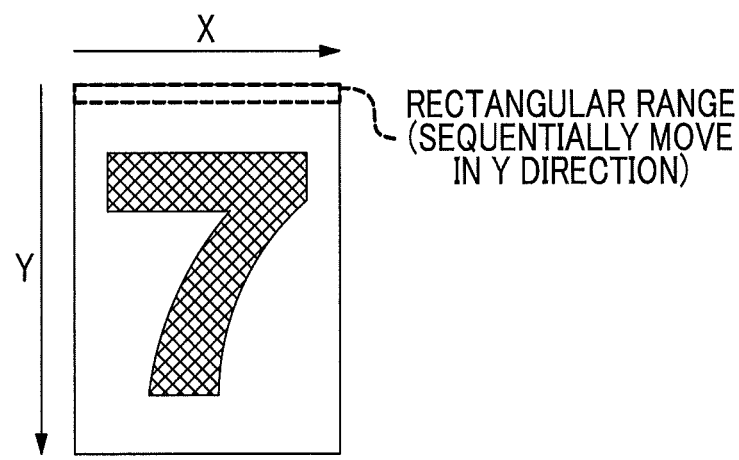
FIGS. 5A and 5B are front views illustrating an image which is a dot area extraction target.
Figure 5B:
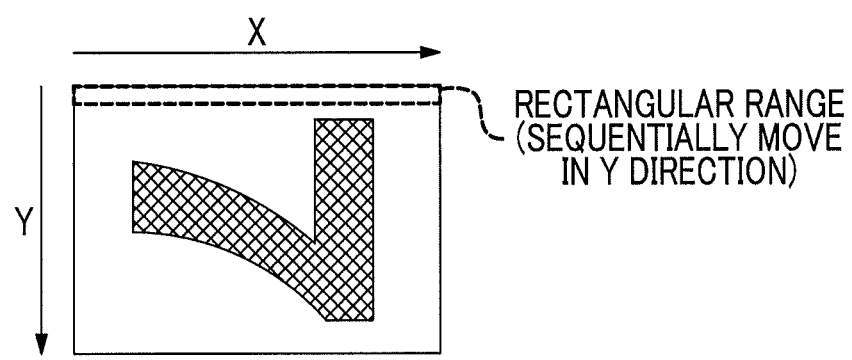

That is, FIGS. 5A and 5B illustrate the same images, and the images are acquired by relatively rotating an image, which is formed based on the binary image data, by 90°.

FIG. 5A illustrates an image which is vertically long, in which a short side direction is the X direction, and in which a long side direction is the Y direction. In contrast, FIG. 5B illustrates an image which is horizontally long, in which a long side direction is the X direction, and in which a short side direction is the Y direction. With regard to a square image, an image, which is acquired by relatively performing 90° rotation, is set up in the same manner.

As illustrated in FIG. 4, the X-Y direction setting unit 154 is connected to a rectangular range setting unit 156.

The rectangular range setting unit 156 sequentially provides instructions related to combination information of the number of X directional pixels and the number of Y directional pixels of predetermined plural patterns.

An image data reading unit 158 connected to the image data storing unit 152 reads the corresponding binary image data based on the combination information of the number of X directional pixels and the number of Y directional pixels, which is received from the rectangular range setting unit 156. Meanwhile, in the exemplary embodiment, the number of X directional pixels indicates the number of pixels (1 line) in the entire rectangular ranges in the X direction, and the number of Y directional pixels (the number of lines) is set up in a range which is determined by the resolution (for example, 2,400 dpi) of the specific image processing device 10 and the number of screen lines (for example, 130 to 230 lpi).

More specifically, when the number of screen lines is 150 "unit: lpi (line per inch)", the number of Y directional pixels (the number of lines) is operated by 2,400 dpi/150 lpi. When it is assumed that the number of Y directional pixels (the number of lines) is 16 pixels (the number of lines), a dot is certainly present in Y directional pixels.

However, even when it is assumed that the resolution of the specific image processing device 10 is fixed to 2,400 dpi, the number of screen lines of the received binary image data is obscure, and thus it is difficult to settle the number of Y directional pixels as in the above-described detailed example.

Here, in the exemplary embodiment, based on the range of the number of screen lines which may be estimated (130 lpi to 230 lpi in the above description), the maximum value and the minimum value of the number of Y directional pixels are operated, the number of Y directional pixels of the plural patterns (the number of rectangular range patterns) is determined in the range of the maximum value and the minimum value, and the number of Y directional pixels is sequentially instructed as the combination information with the number of X directional pixels.

In the exemplary embodiment, as the candidates of the number of Y directional pixels, 10 types of (10 to 19 pixels) rectangular range patterns are generated from 10 pixels (lines) to 19 pixels (lines) in units of one pixel. Meanwhile, the number of rectangular range patterns is not limited thereto.

As illustrated in FIG. 4, the image data reading unit 158 is connected to a black pixel extracting unit 160. The black pixel extracting unit 160 determines whether or not a specific binary pixel (black pixel), which is a target pixel of the binary image data arranged in the Y direction, is present based on the combination information which is read by the image data reading unit 158. The determination is sequentially performed along the X direction, and the result of the determination (presence of black pixel/white pixel information) is transmitted to an X directional cycle specifying unit 162.

The X directional cycle specifying unit 162 has a one-dimensional profile preparation function and a differential processing function.

In the one-dimensional profile function, a distribution characteristic diagram ranging the X direction (refer to FIG. 6A) is prepared based on the result of the determination of whether or not the dot is present. Meanwhile, the distribution in FIG. 6A illustrates an accumulated number when a black image is set to 1 and a white image is set to 0.

Figure 6A:
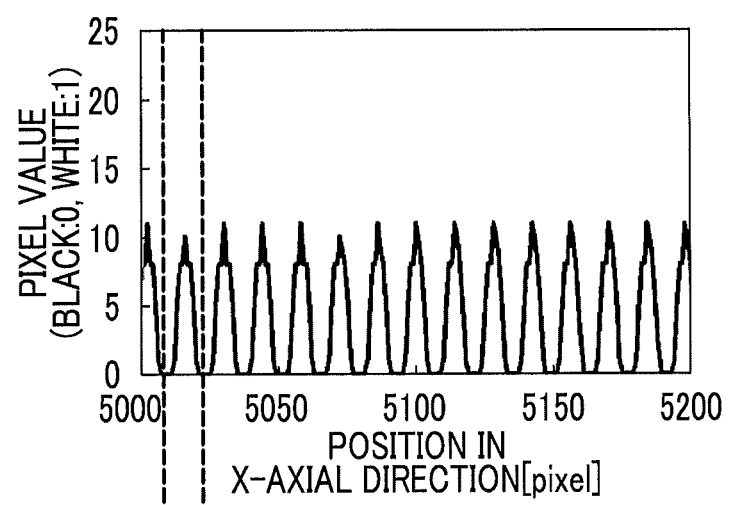
FIG. 6A is a diagram illustrating a one-dimensional profile in the rectangular ranges of binary image data according to the exemplary embodiment.

In addition, in the differential processing function, a differential characteristic diagram (refer to FIG. 6B) is prepared based on the distribution characteristic diagram of FIG. 6A.

Figure 6B:
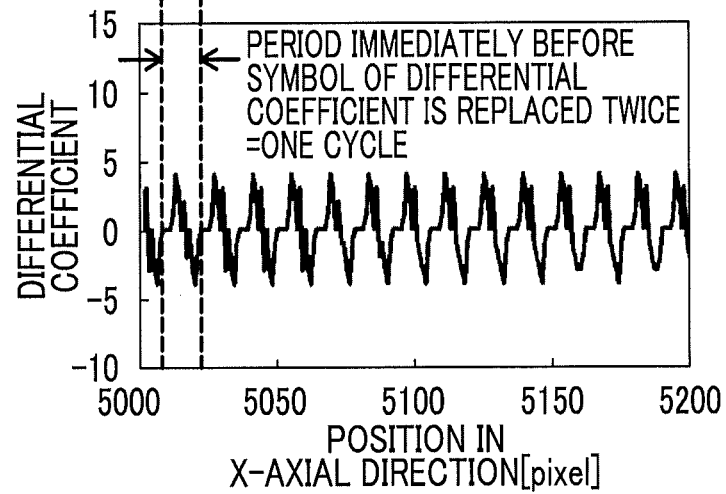
FIG. 6B is a differential characteristic diagram of FIG. 6A.

Here, as illustrated in FIG. 6B, the X directional cycle specifying unit 162 performs comparison of the result of differentiation along the X direction, and specifies cycles in the X direction while a period until the symbol (plus/minus) of a differential coefficient is replaced twice is set to one cycle.

As illustrated in FIG. 4, the X directional cycle specifying unit 162 is connected to a cycle histogram preparing unit 164.

Figure 7A:
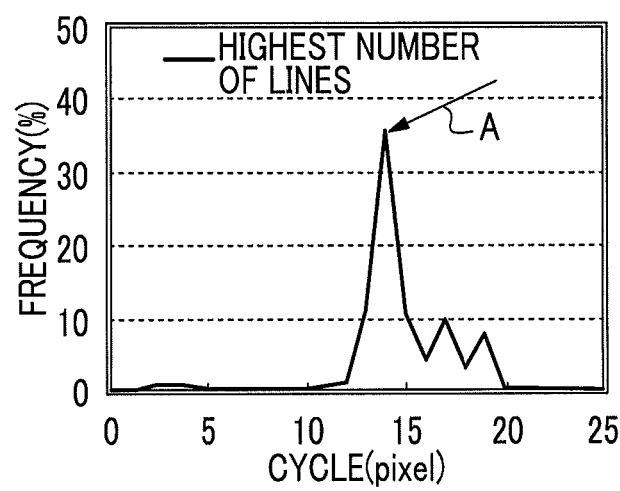
FIGS. 7A and 7B are cycle histograms extracted from the differential characteristic diagram of FIG. 6B according to the exemplary embodiment.
Figure 7B:
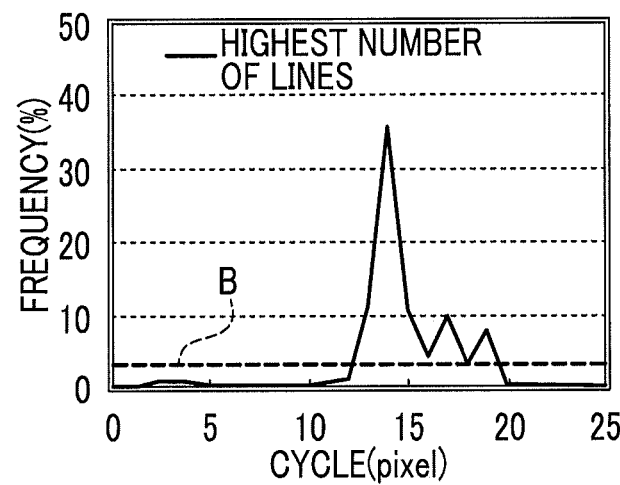

That is, the cycle histogram preparing unit 164 prepares a cycle histogram in the rectangular ranges by sequentially fetching a cycle included in the rectangular ranges, which is specified by the X directional cycle specifying unit 162 (refer to FIGS. 7A and 7B).

The cycle histogram preparing unit 164 is connected to a repetition necessity determining unit 168.

In addition, the cycle histogram preparing unit 164 transmits a signal of n indicating an increment (n←n+1) to the repetition necessity determining unit 168 whenever the preparation ends.

The repetition necessity determining unit 168 compares n represented by a signal received from the cycle histogram preparing unit 164, with N indicating a rectangular range execution frequency notified from the rectangular range setting unit 156 in advance.

The repetition necessity determining unit 168 instructs the image data reading unit 158 to read image data in a subsequent rectangular range (n≤N) based on the result of the comparison, or instructs a dot area extracting unit 166 to extract the dot areas of the entire image. Further, the repetition necessity determining unit 168 transmits a signal of m indicating an entire image end, which indicates that the extraction of the dot areas is completed in all of the rectangular ranges, to a Y directional pixel number update propriety determining unit 172 (n>N).

The dot area extracting unit 166 extracts the dot area for each of the rectangular ranges based on the result prepared by the cycle histogram preparing unit 164.

The extraction of the dot areas is determined by the frequency of periodicity. FIG. 7A illustrates a case in which a pixel that has the highest frequency of periodicity (refer to arrow A in FIG. 7A) is set to the dot area, and FIG. 7B illustrates a case in which a pixel in which the frequency of periodicity exceeds a predetermined threshold (refer to arrow B in FIG. 7B) is set to the dot area. The dot area may be extracted under any condition.

A dot area for each rectangular range, which is extracted by the dot area extracting unit 166, is stored in a dot area extraction information storing unit 170.

The Y directional pixel number update propriety determining unit 172 performs determination below by comparing m indicating an entire image end with M indicating a rectangular range pattern execution frequency, which is notified by the rectangular range setting unit 156 in advance.

(Determination 1) in a process of extracting the dot area of the binary image data corresponding to one page, it is determined whether or not to change the number of Y directional pixels and to perform the process again.

In determination 1, when it is determined to change the number of Y directional pixels and to perform the process again (m≤M), the Y directional pixel number update propriety determining unit 172 outputs an instruction, which instructs the rectangular range setting unit 156 to change the number of Y directional pixels and to perform the process again, through a Y directional pixel number change instructing unit 174.

(Determination 2) in the process of extracting the dot area of the binary image data corresponding to one page, it is determined whether or not to reverse the X-Y directions and to perform the process again.

In determination 2, when it is determined to reverse the X-Y directions and to perform the process again (m>M, that is before replacement), the Y directional pixel number update propriety determining unit 172 instructs the X-Y direction setting unit 154 to rotate the image by 90° and replace the X-Y directions through an X-Y direction determining unit 176. Based on the instruction, in the rectangular range setting unit 156, the conceptions of the X direction and the Y direction are reversed.

(Determination 3) in the process of extracting the dot area of the binary image data corresponding to one page, it is determined whether or not the entire process (corresponding to one page) ends.

In determination 3, when it is determined that the entire process (corresponding to one page) ends (m>M, that is, replacement ends), an execution instructing signal A is output to a dot area composing unit 178.

Based on the signal A, the dot area composing unit 178 fetches dot area extraction information which is stored in the dot area extraction information storing unit 170, and composes the fetched dot area extraction information (logical addition process).

The result of the composition performed in the dot area composing unit 178, that is, final dot area extraction information is output to, for example, a processing unit, which includes a data correction function, through a dot area extraction result output unit 180.

The data correction function is performed, for example, for correction (reduction in the number of dots) by uniformly reducing density on the dot area in the binary image data. The data correction function may be performed by the server 100 or may be performed by the main controller 30 of the specific image processing device 10.

Hereinafter, an operation of the exemplary embodiment will be described with reference to a flowchart of FIG. 8.

Figure 8:
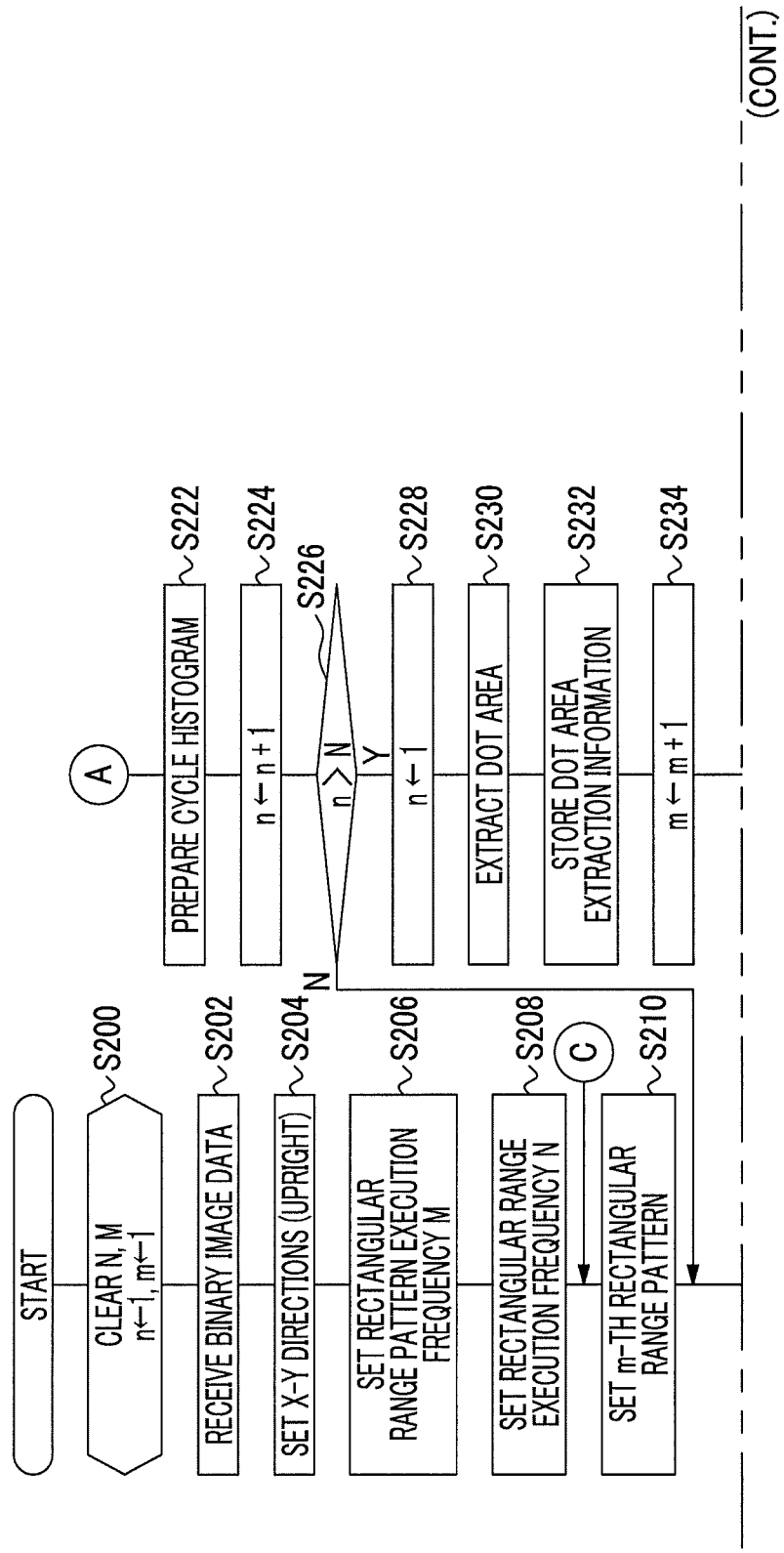
FIG. 8 is a flowchart illustrating a dot area extraction control routine according to the exemplary embodiment.

FIG. 8 is a flowchart illustrating a dot area extraction control routine.

In step S200, as initial setting, N indicating a rectangular range execution frequency and M indicating a rectangular range pattern execution frequency are cleared, and variables n and m are set to 1. Thereafter, the process proceeds to step S202.

In step S202, the binary image data is received. Thereafter, the process proceeds to step S204 and the X-Y directions are set. Immediately after the binary image data is received, X-Y directions are set as a so-called upright image, as illustrated in FIG. 5A. Thereafter, the process proceeds to step S206.

In step S206, the rectangular range pattern execution frequency M is set.

In the exemplary embodiment, with regard to the rectangular range pattern execution frequency M, the maximum value and the minimum value of the number of Y directional pixels are operated based on the range (130 lpi to 230 lpi) of the number of screen lines which may be estimated, and the number of Y directional pixels of the plural patterns (the number of rectangular range patterns) is determined in the range between the maximum value and the minimum value. Therefore, it is possible to extract a black pixel from any of the set patterns.

Meanwhile, when there is change in the number of screen lines which may be estimated, the maximum value and the minimum value may be operated at each time.

Subsequently, in step S208, the rectangular range execution frequency N is set based on the set rectangular range pattern (the number of Y directional pixels). The rectangular range execution frequency N is a value acquired by dividing the entire lines of the binary image data by the number of rectangular range patterns, and it is possible to set the entire image data as the rectangular ranges by rounding off a remainder.

Subsequently, in step S210, an m-th (in the initial setting, m=1) rectangular range pattern is set. Subsequently, the process proceeds to step S212, an n-th (in the initial setting, n=1) rectangular range image data is read and the process proceeds to step S214.

In step S214, in the rectangular ranges, whether or not a black image which is a specific image is present is extracted. Subsequently, the process proceeds to step S216, and the one-dimensional profile of the extracted black image is prepared.

Although FIG. 6A illustrates the one-dimensional profile of the dot area, the one-dimensional profile of the FIG. 6A determines whether or not periodicity is present as a section which determines whether or not the dot area is present in the exemplary embodiment.

That is, in step S218, the differential characteristic diagram of the one-dimensional profile of FIG. 6A (refer to FIG. 6B) is prepared based on the one-dimensional profile, which is prepared in step S216. Thereafter, the process proceeds to step S220 and a cycle is determined.

That is, in step S220, results of differentiation performed in step S218 are compared along the X direction, and a cycle in the X direction is specified by setting a period until the symbol (plus/minus) of a differential coefficient is replaced twice to one cycle. Meanwhile, the determination of periodicity is not limited to the determination based on the differential characteristic and the determination may be performed by performing direct image analysis on the one-dimensional profile of FIG. 6A.

In step S220, when the cycle determination ends, the process proceeds to step S226 and the cycle histogram is prepared (refer to FIGS. 7A and 7B).

Subsequently, in step S224, a variable n increases (n←n+1). Subsequently, the process proceeds to step S226, and it is determined whether or not the variable n exceeds the rectangular range execution frequency N (n>N).

When a negative determination is made in step S226, it is determined that a non-executed rectangular range remains. The process proceeds to step S212, and the above processes are repeated.

In addition, when a positive determination is made in step S226, it is determined that the extraction of the dot area of an image corresponding to one page ends, and the process proceeds to step S228.

In step S228, variable n returns to the initial value 1. Subsequently, the process proceeds to step S230.

In step S230, a pixel in which the frequency of periodicity is high is extracted as the dot area. When the cycle histogram illustrated in FIG. 7A is observed, it is understood that the frequency of a specific cycle (refer to arrow A of FIG. 7A) is high. An area which includes the specific cycle is the dot area.

In contrast, when the cycle histogram illustrated in FIG. 7A is observed, it is understood that plural peaks are present. Here, as illustrated in FIG. 7B, an area which includes the cycles of all of the peaks which exceed a predetermined threshold value B may be set to the dot area.

Subsequently, in step S232, the dot area extraction information, which is extracted in step S230, is stored, and the process proceeds to step S234.

In step S234, the variable m increases (m←m+1) and, subsequently, the process proceeds to step S236 and it is determined whether or not the variable m exceeds the rectangular range pattern execution frequency M (m>M).

When a negative determination is made in step S236, it is determined that non-executed rectangular range pattern remains, the process proceeds to step S210, and the above processes are repeated. In this case, since the variable n returns to the initial value, image data is read from a first rectangular range.

In addition, when a positive determination is made in step S236, it is determined that the extraction of the dot area ends in the entirety of the rectangular range patterns, and the process proceeds to step S238.

In step S238, it is determined whether or not replacement of the binary image data ends, that is, whether or not 90° rotation is performed.

That is, in the exemplary embodiment, in a single image, dot area extraction is performed in a belt-shaped rectangular range along the X direction in the upright state illustrated in FIG. 5A, and dot area extraction is performed in a belt-shaped rectangular range along the X direction in a 90°-rotated state illustrated in FIG. 5B.

When a negative determination is made in step S238, the process proceeds to step S240. At this point in time, it is determined that the dot area extraction in the upright state illustrated in FIG. 5A ends and the dot area extraction in the 90°-rotated state is unfinished. The process proceeds to step S240, the binary image data is rotated by 90° and the X-Y directions are replaced. The process proceeds to step S242. In step S242, the variable m returns to the initial value 1, the process proceeds to step S210, and the above process (dot area extraction process) is repeated based on the 90°-rotated image of FIG. 5B. In this case, since the variable m and the variable n respectively return to the initial values 1, the dot area extraction starts from the first rectangular range of the first rectangular range pattern.

In addition, when a positive determination is made in step S238, it is determined that the dot area extraction ends in the upright state illustrated in FIG. 5A and the dot area extraction in the 90°-rotated state illustrated in FIG. 5B ends. The process proceeds to step S244.

In step S244, the entire dot area extraction information, which is stored in step S226, is read. The process proceeds to step S246 and the composition process is performed.

The composition process is the logical addition process of the entire dot area extraction information. At least one area, which is determined as the dot area, is settled to the dot area.

Subsequently, in step S248, the result of the settled dot area extraction is output, and the routine ends.

The result of the output dot area extraction is transmitted to, for example, the specific image processing device 10 according to the exemplary embodiment, specialized to an area which is determined as the dot area in the binary image data, and then density correction is performed.

It is possible for the specific image processing device 10 to perform a process at a resolution of 2,400 dpi, and an image is formed by directly applying dot-processed (screened) binary image data.

At this time, when the image is formed based on the binary image data in an electrophotograpic manner, for example, the change in density affected by the dot size factors of a developer (toner) or the change in density due to the gain of optical dots in printing occurs. Generally, the density tends to be thick (reproducibility deteriorates) with regard to the image in printing regardless of the factors.

Here, for example, except for a part where there is not a problem related to reproducibility that is a so-called black header image (characters and line images), specialization in the dot area (halftone area) is performed, and correction for suppressing density is performed.

FIG. 9 is a diagram illustrating a visually expressed flow of a dot area extraction course according to the flow of the flowchart of FIG. 8.

That is, an original image (binary image data) illustrated in FIG. 9(1) is decomposed into strip shapes (rectangular ranges, refer to FIG. 9(2)), and dot area extraction is performed in the entire rectangular ranges. The dot area extraction is performed plural times while changing the widths of the strips (the number of Y directional pixels), and the dot areas are specialized through logical addition (refer to FIG. 9(3)). Meanwhile, hatched areas in FIG. 9(1) are simply drawn to indicate areas which are formed by micro-dots, that is, dots. In addition, white-blanking parts in the results of the dot area extraction of FIG. 9(3) indicate areas which are determined as the dot areas.

Subsequently, the original image illustrated in FIG. 9(1) is rotated by 90° (refer to FIG. 9(4)).

The 90°-rotated binary image data is decomposed into strip shapes (rectangular ranges, refer to FIG. 9(5)), and dot area extraction is performed in the entire rectangular ranges. The dot area extraction is performed plural times while changing the widths of the strips (number of Y directional pixels), and the dot areas are specialized through logical addition (refer to FIG. 9(6)). Meanwhile, white-blanking parts of FIG. 9(6) indicate areas which are determined as the dot areas.

In the end, the dot areas, which are acquired in FIG. 9(3) and FIG. 9(6), are composed. Further, the logical addition process is performed, and thus the dot areas are finally specialized (refer to FIG. 9(7)). Meanwhile, white-blanking parts of FIG. 9(7) indicate areas which are determined as the dot areas.

Meanwhile, in the exemplary embodiment, the dot areas are extracted by setting laterally-long strip-shaped rectangular ranges which include all pixels in the X direction (lateral direction) and prescribed pixels in the Y direction in a state in which the binary image data is upright. Subsequently, the dot areas are extracted by setting laterally-long strip-shaped rectangular ranges which include all pixels in the X direction (lateral direction) and prescribed pixels in the Y direction in a state in which the binary image data is rotated by 90°.

However, the dot areas may be extracted by applying the binary image data in the upright state without change and by setting laterally-long strip-shaped rectangular ranges which initially include all pixels in the X direction (lateral direction) and prescribed pixels in the Y direction. Subsequently, the dot areas may be extracted by setting laterally-long strip-shaped rectangular ranges which include all pixels in the Y direction and prescribed pixels in the X direction.

In addition, the function as the dot area extraction control device is not limited to the server 100, and may be built into the PC 21 or the main controller 30 of the specific image processing device 10. In this case, the image processing system through the communication line network 20 as illustrated in FIG. 1 is not always necessary. In addition, the dot area extraction function program may be stored in the recording medium.

That is, when the PC 21 includes the dot area extraction control function, the PC 21 and the image processing device 10 may be connected to each other such that communication is possible. In addition, when the main controller 30 of the specific image processing device 10 includes the dot area extraction control function, printing image data may be fetched through the recording medium, and the dot area extraction control function may be independently performed by the specific image processing device 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A dot area extraction method comprising:
   extracting a first dot area in binary data based on periodicity of pixels for every first range by dividing the binary data in a first direction or a second direction in the first range which includes a first number of pixels in the first direction and a second number of pixels in the second direction; and
   extracting a second dot area in the binary data based on the periodicity of the pixels for every second range by dividing the binary data in the first direction or the second direction in the second range which includes a third number of pixels in the first direction and a fourth number of pixels in the second direction,
   wherein the first direction crosses the second direction,
   wherein at least the first number of pixels is not equal to the third number of pixels, or the second number of pixels is not equal to the fourth number of pixels, and
   wherein a dot area of the binary data is extracted by combining respective results of extraction of the first dot area and the second dot area.

2. The dot area extraction method according to claim 1,
   wherein a division direction is the first direction in the extracting of the first dot area and the extracting of the second dot area, and
   wherein the second number of pixels is not equal to the fourth number of pixels.

3. The dot area extraction method according to claim 1,
   wherein a division direction is the first direction in the extracting of the first dot area,
   wherein the division direction is the first direction in the extracting of the second dot area,
   wherein the dot area extraction method further comprises:
   extracting a third dot area in the binary data based on the periodicity of pixels for every third range by dividing the binary data in the second direction in the third range which includes a fifth number of pixels in the first direction and a sixth number of pixels in the second direction; and
   extracting a fourth dot area in the binary data based on the periodicity of the pixels for every fourth range by dividing the binary data in the second direction in the fourth range which includes a seventh number of pixels in the first direction and an eighth number of pixels in the second direction,
   wherein the second number of pixels is not equal to the fourth number of pixels,
   wherein the fifth number of pixels is not equal to the seventh number of pixels, and
   wherein a dot area of the binary data is extracted by combining respective results of extraction of the first dot area, the second dot area, the third dot area, and fourth dot area.

4. The dot area extraction method according to claim 1,
   wherein the first direction and the second direction correspond to a row direction and a column direction.

5. The dot area extraction method according to claim 1,
   wherein the first direction is a row direction and the second direction is a column direction,
   wherein the extracting of the first dot area and the extracting of the second dot area include dividing in the first direction, and
   wherein the first number of pixels and the third number of pixels are equal to an entire number of pixels in the row direction.

6. The dot area extraction method according to claim 1,
   wherein the first direction is a row direction and the second direction is a column direction, wherein the extracting of the first dot area and the extracting of the second dot area include dividing in the second direction, and wherein the second number of pixels and the fourth number of pixels are equal to an entire number of pixels in the column direction.

7. The dot area extraction method according to claim 5, wherein the second number of pixels and the fourth number of pixels are any one of 10 to 19.

8. The dot area extraction method according to claim 6, wherein the first number of pixels and the third number of pixels are any one of 10 to 19.

9. A dot area extraction device comprising:
a first dot area extraction unit that extracts a first dot area in binary data based on periodicity of pixels for every first range by dividing the binary data in a first direction or a second direction in the first range which includes a first number of pixels in the first direction and a second number of pixels in the second direction; and
a second dot area extraction unit that extracts a second dot area in the binary data based on the periodicity of the pixels for every second range by dividing the binary data in the first direction or the second direction in the second range which includes a third number of pixels in the first direction and a fourth number of pixels in the second direction,
wherein the first direction crosses the second direction,
wherein at least the first number of pixels is not equal to the third number of pixels, or the second number of pixels is not equal to the fourth number of pixels, and
wherein a dot area of the binary data is extracted by combining respective results of extraction of the first dot area and the second dot area.

10. The dot area extraction device according to claim 9, wherein a division direction is the first direction in the extracting by the first dot area extraction unit and the extracting by the second dot area extraction unit, and
wherein the second number of pixels is not equal to the fourth number of pixels.

11. The dot area extraction device according to claim 9, wherein a division direction is the first direction in the extracting by the first dot area extraction unit,
wherein the division direction is the first direction in the extracting by the second dot area extraction unit,
wherein the dot area extraction device further comprises:
a third dot area extraction unit that extracts a third dot area in the binary data based on the periodicity of pixels for every third range by dividing the binary data in the second direction in the third range which includes a fifth number of pixels in the first direction and a sixth number of pixels in the second direction; and
a fourth dot area extraction unit that extracts a fourth dot area in the binary data based on the periodicity of the pixels for every fourth range by dividing the binary data in the second direction in the fourth range which includes a seventh number of pixels in the first direction and an eighth number of pixels in the second direction,
wherein the second number of pixels is not equal to the fourth number of pixels,
wherein the fifth number of pixels is not equal to the seventh number of pixels, and
wherein a dot area of the binary data is extracted by combining respective results of extraction of the first dot area, the second dot area, the third dot area, and fourth dot area.

12. The dot area extraction device according to claim 9, wherein the first direction and the second direction correspond to a row direction and a column direction.

13. The dot area extraction device according to claim 9, wherein the first direction is a row direction and the second direction is a column direction,
wherein the extracting of the first dot area and the extracting of the second dot area include dividing in the first direction, and
wherein the first number of pixels and the third number of pixels are equal to an entire number of pixels in the row direction.

14. The dot area extraction device according to claim 9, wherein the first direction is a row direction and the second direction is a column direction,
wherein the extracting by the first dot area extraction unit and the extracting by the second dot area extraction unit include dividing in the second direction, and
wherein the second number of pixels and the fourth number of pixels are equal to an entire number of pixels in the column direction.

15. The dot area extraction device according to claim 13, wherein the second number of pixels and the fourth number of pixels are any one of 10 to 19.

16. The dot area extraction device according to claim 14, wherein the first number of pixels and the third number of pixels are any one of 10 to 19.

17. A non-transitory computer readable medium storing a dot area extraction program causing a computer to execute:
extracting a first dot area in binary data based on periodicity of pixels for every first range by dividing the binary data in a first direction or a second direction in the first range which includes a first number of pixels in the first direction and a second number of pixels in the second direction; and
extracting a second dot area in the binary data based on the periodicity of the pixels for every second range by dividing the binary data in the first direction or the second direction in the second range which includes a third number of pixels in the first direction and a fourth number of pixels in the second direction,
wherein the first direction crosses the second direction,
wherein at least the first number of pixels is not equal to the third number of pixels, or the second number of pixels is not equal to the fourth number of pixels, and
wherein a dot area of the binary data is extracted by combining respective results of extraction of the first dot area and the second dot area.

18. The non-transitory computer readable medium storing a dot area extraction program according to claim 17,
wherein a division direction is the first direction in the extracting of the first dot area and the extracting of the second dot area, and
wherein the second number of pixels is not equal to the fourth number of pixels.

19. The non-transitory computer readable medium storing a dot area extraction program according to claim 17,
wherein a division direction is the first direction in the extracting of the first dot area,
wherein the division direction is the first direction in the extracting of the second dot area,
wherein the dot area extraction program further comprises:
extracting a third dot area in the binary data based on the periodicity of pixels for every third range by dividing the binary data in the second direction in the third range which includes a fifth number of pixels in the first direction and a sixth number of pixels in the second direction; and extracting a fourth dot area in the binary data based on the periodicity of the pixels for every fourth range by dividing the binary data in the second direction in the fourth range which includes a seventh number of pixels in the first direction and an eighth number of pixels in the second direction, wherein the second number of pixels is not equal to the fourth number of pixels, wherein the fifth number of pixels is not equal to the seventh number of pixels, and wherein a dot area of the binary data is extracted by combining respective results of extraction of the first dot area, the second dot area, the third dot area, and fourth dot area.

* * * * *